United States Patent [19]

Dakin et al.

[11] Patent Number: 4,537,803
[45] Date of Patent: Aug. 27, 1985

[54] RESINS CONTAINING A LOW VISCOSITY ORGANOPOLYSILOXANE LIQUID DIELECTRIC AND A METHOD OF INSULATING A CONDUCTOR THEREWITH

[75] Inventors: Thomas W. Dakin, Boca Raton, Fla.; Stanley A. Studniarz, Murrysville, Pa.; Terrence E. Chenoweth, Watkinsville, Ga.

[73] Assignee: Westinghouse Corp., Pittsburg, Pa.

[21] Appl. No.: 613,672

[22] Filed: May 24, 1984

[51] Int. Cl.³ .................. B05D 3/02; B32B 15/08; B32B 27/38
[52] U.S. Cl. .................. 427/385.5; 427/386; 427/387; 428/418; 428/425.8; 428/458; 523/173; 523/400; 523/456; 524/730; 524/731
[58] Field of Search .................. 523/173, 400, 456; 427/385.5, 386, 387; 524/730, 731; 428/418, 425.8, 458

[56] References Cited

U.S. PATENT DOCUMENTS

| | | | |
|---|---|---|---|
| 3,278,673 | 10/1966 | Gore | 174/120 |
| 3,358,064 | 12/1967 | Belko | 523/456 |
| 3,926,885 | 12/1975 | Keil | 523/456 |
| 4,202,811 | 5/1980 | Michael et al. | 523/456 |
| 4,349,651 | 9/1982 | Smith | 526/263 |
| 4,419,484 | 12/1983 | Sattlegger et al. | 524/730 |
| 4,439,630 | 3/1984 | Groenhof | 524/730 |

*Primary Examiner*—Ronald W. Griffin
*Attorney, Agent, or Firm*—D. P. Cillo

[57] ABSTRACT

A fluid, insulating composition, useful for casting around conductors, is made from a liquid, polymerizable organic resin system, and a liquid, non-polymerizable organopolysiloxane dielectric filler partially soluble in the organic resin system and having the structural formula:

$$(R)_3-Si[OSi(R)_2]_n OSi(R)_3,$$

where $n = 0$ to about 10, and each R group is selected from H, alkyl having from 1 to 6 carbons, and phenyl, where the dielectric is added in an amount such that, upon polymerization of the organic resin system to form a resin matrix containing dielectric filler, the dielectric will flow or diffuse through the resin matrix into cavities or voids in or bordering the composition or near any insulated conductors or other insulated articles.

5 Claims, 1 Drawing Figure

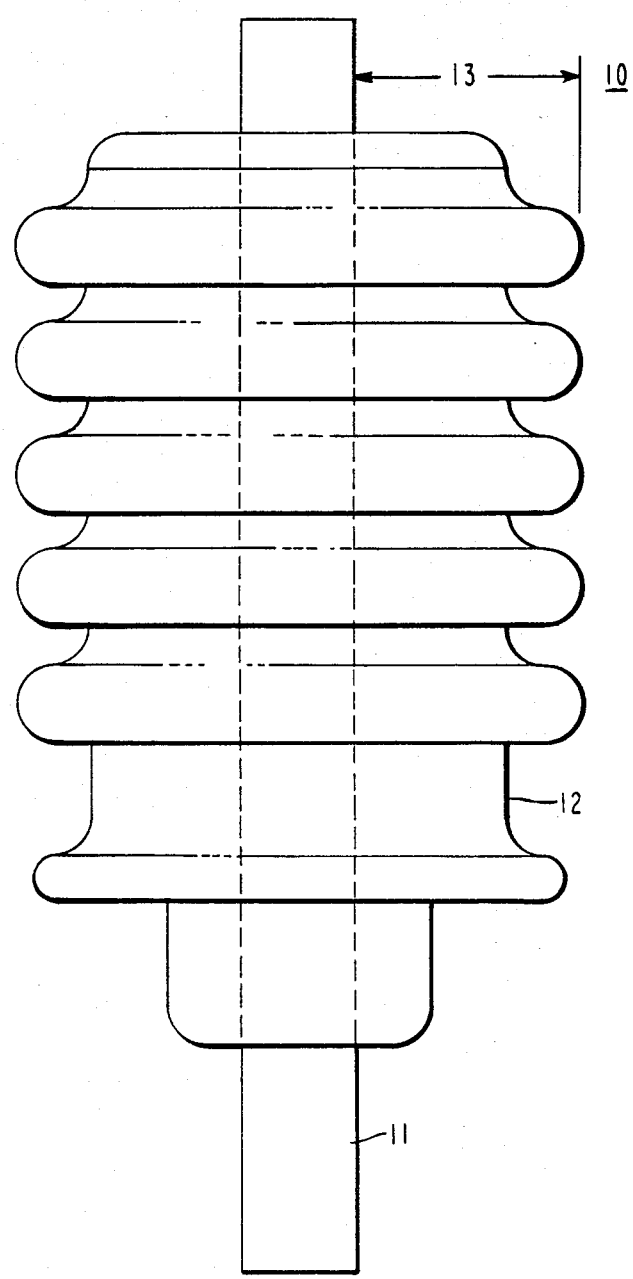

RESINS CONTAINING A LOW VISCOSITY ORGANOPOLYSILOXANE LIQUID DIELECTRIC AND A METHOD OF INSULATING A CONDUCTOR THEREWITH

BACKGROUND OF THE INVENTION

Anhydride cured epoxy resins, alone, and in admixture with catalytic copolymers, have been used in liquid resin casting and potting operations, to provide insulated, electrical bushings, coils, and the like, as described, for example, by Smith, in U.S. Pat. No. 4,349,651. It has been well known for many years that the dielectric strength of cured organic resins, such as cured epoxy resins, and filled compositions in which they are a part, decline in dielectric strength under voltage stress, particularly a-c voltage stress. This is attributed to the effect of partial discharges on the surface or within internal cavities of the cured resin.

When resins are vacuum cast around metal electrodes or conductors, internal cavities are reduced or nearly eliminated, but not always completely. Cavities may occur as a result of differential shrinkage of the resin with respect to the metal conductors, upon thermal cycling, if the resin, or filled resin thermal expansion coefficient is not completely matched to that of the metal. Cavities may also occur due solely to resin shrinkage during polymerization, where unfilled epoxy resin, for example, exhibits about 5% shrinkage, and filled epoxy resin, exhibits from about 1% to 2% shrinkage.

When the cavities are not too small, the partial discharges within them under voltage stress can be detected. Better degassing and vacuum processing of the resin, and use of extreme care in handling the conductor parts and mold, can reduce the chance of cavities and their size. However, even with the best practical processing, it has been the experience that cast prior art resin systems have a finite voltage endurance which limits the voltage stress at which they can be used in service. This limitation can be indicated by exposing the insulated, vacuum cast conductors or electrodes to high voltage stresses for long periods of time.

Gore, in U.S. Pat. No. 3,278,673, recognized shrinkage caused cavity problems in polytetrafluoroethylene insulated, 25 mil. (0.06 cm) diameter wire. Gore, in an attempt to alleviate this problem, soaked 4 mil. (0.01 cm) thick, substantially unsintered, porous tape, consisting of polytetrafluoroethylene resin particles, in a high boiling, liquid dielectric fluid, such as poly(methyl, phenyl)siloxane or polymethylsiloxane, and then wrapped three turns of the tape around the conductor, to provide a total insulation about 12 mil. (0.03 cm) thick. This was followed by sintering the polytetrafluoroethylene resin particles at about 360° C. The sintering caused 25% shrinkage, and collapse of the spongy, cellular structure of the unsintered polytetrafluoroethylene resin, trapping the liquid dielectric fluid uniformly throughout the resin tape multiple layer cross-section. If a cavity near the conductor was enlarged by a-c voltage stress, the nearby dielectric fluid droplets controlled such cavity growth.

The Gore system is designed for thin insulation layers. What is needed, however, is a low shrinkage, liquid casting composition useful for thick resin insulation systems, where most void problems, upon thermal cycling or under voltage stress, are most likely to occur at the conductor-resin interface.

SUMMARY OF THE INVENTION

The above need has been met by providing a metal conductor contacted by a fluid, insulating, resinous composition, preferably containing a polymerizable, organic, epoxy-anhydride resin system, and a low viscosity, liquid, non-polymerizable organopolysiloxane dielectric filler, partially soluble in the resin system and dispersed therethrough. The dielectric is added in an amount effective, so that upon polymerization of the organic resin system to form a resin matrix containing the dielectric filler, the dielectric will flow or diffuse through the resin matrix into cavities in or bordering the composition. The organopolysiloxane is sufficiently mobile, even after resin cure, to fill voids formed by thermal cycling or voltage stress, especially near the conductor surface or any other insulated article.

The primary use of this resin system is as a casting insulation for bushing conductors, cables, post insulators, cryogenic termination studs, and the like. Most applications will have an insulation thickness greater than about 62 mils (1/16 inch), and an electric stress in the resin at the embedded conductor surfaces greater than about 30 volts/mil. (11.8 kV./cm.). In some instances, cryogenic termination studs having thicknesses of up to about 4 inches could be insulated to a thickness of about 6 inches. The insulation can contain from about 0 wt% to about 85 wt% filler, such as finely divided quartz particles. Preferably, the insulation will contain from about 20 wt% to about 85 wt% filler. The use of from about 2 wt% to about 15 wt% organopolysiloxane, based on resin-curing agent-filler-siloxane weight, is effective to essentially eliminate voltage stress failure. This resinous composition might also be used to pot small distribution pole type transformers, and the like, and as a cast resin spacer, with cast in electrodes, for high voltage compressed gas systems.

In providing this insulating resinous composition, liquid organopolysiloxane is mixed in a liquid resin system that preferably has thermoset cure properties, such as an epoxy resin-anhydride system, and in which the organopolysiloxane is partially soluble, so that substantial solution of the organopolysiloxane, and homogeneous mixing with the resin occur. This admixture is then generally vacuum cast into a mold to surround the conductor or other article to be insulated. Upon hot molding, as the resin system polymerizes and cures to form a hard, solid insulation, the non-polymerizable organopolysiloxane precipitates as a liquid to fill any voids present. Thus the filled resin forms a matrix for the dielectric, which dielectric can diffuse during resin curing, partly through the partially cured resin and partly along the interface between filler particles and resin, to seek out and fill cavities.

BRIEF DESCRIPTION OF THE DRAWING

For a better understanding of the invention, reference may be made to an embodiment exemplary of the invention, shown in the accompanying drawing, which illustrates one type of bushing insulated with the resinous composition of this invention.

DESCRIPTION OF THE PREFERRED EMBODIMENTS

Useful base resin systems for the insulating composition of this invention include liquid urethane resin systems, liquid polyester resin systems, and preferably liquid epoxy resin systems, all having a viscosity of from about 5 cps. to about 40,000 cps. at 25° C. In the preferred epoxy resin system, which system contains epoxy plus hardener, the epoxy resin can be selected from low viscosity epoxies, such as diglycidyl ethers of aliphatic diols, i.e., diglycidyl ether of neopentyl glycol, and the like, having viscosities of from about 5 cps. to about 60 cps. at 25° C., and higher viscosity epoxies, such as diglycidyl ethers of bisphenol A or bisphenol F, novolacs, glycidyl esters, hydantoins, cycloaliphatics, and their mixtures, generally having a viscosity of from about 250 cps. to about 30,000 cps. at 25° C. The preferred epoxy is a diglycidyl ether of bisphenol A.

For the preferred epoxy resins, suitable anhydride type hardeners or curing agents include the conventional organic mono- and poly-functional anhydrides. Typical of the monofunctional anhydrides are hexahydrophthalic anhydride, tetrahydrophthalic anhydride, phthalic anhydride, NADIC anhydride, maleic anhydride and the like. Poly-functional anhydrides which may be employed include pyromellitic dianhydride, polyazelaic polyanhydride, and benzophenone tetracarboxylic acid dianhydride. These organic anhydrides may be used singly or in admixture. Of course other epoxy curing agents or accelerators, such as amines or imidazoles, can also be used. The hardener or curing agent is added in an effective amount, for example, a useful weight ratio of epoxy:anhydride is from about 100:60 to 120.

Liquid polyurethane systems, capable of thermoset cure, can be used as the base resin. These can be made by reaction of a trifunctinal alcohol, such as glycerol or trimethylol propane, and excess isocyanate such as hexamethylene diisocyanate, and are well known in the art. Liquid polyester systems can also be used as the base resin. These can be made by reaction of, for example, aromatic dicarboxylic acid such as isophthalic acid and a tricarboxylic acid such as trimellitic anhydride with a trifunctional alcohol such as trimethylol propane, and are well known in the art. Urethane, polyester, and epoxy resin systems are well known in the art, and reference may be made to J. A. Brydson, *Plastics Materials* 1966, chapters 21, 22 and 23 for a detailed description of these resin systems, and, additionally, U.S. Pat. No. 4,349,651 for a complete description of epoxy resin systems, both herein incorporated by reference. The term "resin system" as used herein is defined as resin plus any hardener or curing agent or accelerator necessary, for example, epoxy plus anhydride plus imidazole.

Thixotropic agents, such as $SiO_2$ and pigments such as $TiO_2$, may be used as aids in fluidizing the composition or enhancing the color tones of the cured resins. Amine or imidazole accelerators, well known in the art can also be added in small effective amounts. Various solid, inorganic, particulate fillers, such as, alumina trihydrate, silica, quartz, beryllium aluminum silicate, lithium aluminum silicate, mica, chopped glass, and mixtures thereof, in average particle sizes of from about 10 microns to 300 microns, may be employed in amounts up to about 565 parts filler per 100 parts of siloxane and epoxy resin plus curing agent, i.e., up to about 85 wt% filler particles. Filler is preferably present from about 20 wt.% to about 85 wt%, based on resin system-organopolysiloxane-filler weight. These fillers are used to improve electrical properties of the resin formulation, to help match thermal expansion characteristics of the resin to contacting conductors, to reduce cost, and to provide potting compounds for transformers, bushing studs and the like.

The low viscosity, liquid, non-polymerizable organopolysiloxane dielectric oil useful in this invention, in amounts of from about 2 wt% to about 15 wt%, preferably from about 2 wt% to about 10 wt%, based on resin-curing agent-filler-siloxane weight, has the structural chemical formula:

$$(R)_3\text{—Si}[OSi(R)_2]_n OSi(R)_3, \qquad (I)$$

where n is from 0 to about 10, preferably from 0 to about 4, and each of the R groups are selected from H, alkyl, having from 1 to 6 carbons, and phenyl. By "non-polymerizable" organopolysiloxane is meant, that in the insulating composition of this invention, the organopolysiloxane will not react with the resin system under the influence of heat to become part of the resin network. The preferred dielectric liquid has a viscosity of from about 10 cps. to about 450 cps. at 25° C., such as polymethyl siloxane.

Use of n greater than about 10 in formula (I), results in less mobile organopolysiloxanes, which are not very effective in flowing or diffusing through the resin matrix to cavities that are initiating, seeking them out and filling them. Diffusion is the probable dominant mechanism of dielectric transfer to cavities in this invention, and is likely to occur one molecule as well as several molecules at a time. If n is greater than about 10, this will result in greater than 95% solubility in the resin because of the high hydrocarbon content, and this will hinder organopolysiloxane precipitation during resin cure.

In the process of this invention, the liquid organopolysiloxane is added to the resin system, preferably an epoxy-anhydride, at from about 25° C. to about 100° C., and mixed vigorously to form a substantially single phase solution of the components. It is essential that the organosiloxane used be substantially soluble, i.e., from about 60% to about 95% soluble, in the resin system, so that a homogeneous mixture is achieved. If the organopolysiloxane is 100% soluble in the resin system, it may not precipitate out of the resin in a mobile form as the resin cures and crosslinks.

It is also important that the organopolysiloxane not be highly volatile or a substantial amount will be lost by evaporation during processing, curing and aging. Use of under about 2 wt% organopolysiloxane will be insufficient to fill the voids to prevent partial discharge in insulated conductor systems under high voltage stress. Use of over about 15 wt% organopolysiloxane will degrade the physical properties of the resin.

Upon hot molding, as the resin component of the admixture cures, the resin polymerization and crosslinking causes the organopolysiloxane to precipitate out of solution as a liquid, to fill any voids in the resin body or next to the conductor, and to be trapped in the resin as a liquid filler. Any later voids or cracks caused by thermal cycling or voltage stress would be filled by the flow or diffusion of the somewhat mobile dielectric liquid filling the resin matrix. The insulating compositions of this invention, if hot mixed, remain pourable and fluid for between ¼ to 1 hours.

Referring now to the Drawing, one type of bushing assembly, 10, is shown, where a conducting stud, 11, has the composition of this invention (usually in highly filled form) cast about it to form the bushing insulation 12. In this type of application, the conducting stud diameter can be about 1 inch (2.54 cm.) thick and the insulation thickness, 13, about 2 inches (5.08 cm.) thick. Usually the conducting stud would be sandblasted, providing a rough surface to which the cast resin can better adhere on a gross scale, but also providing many cavities that the resin cannot easily fill, but to which the low viscosity organopolysiloxane liquid can migrate.

Usually the stud is heated to between about 100° C. and 125° C., and placed in a mold having a surface temperature of about 100° C. Then, degassed, fluid casting resin, containing filler and polysiloxane, usually at a temperature of between about 80° C. and 95° C., is vacuum cast into the mold. After a time effective to completely cure the resin, the mold is released to provide a solid, consolidated bushing assembly. Of course, this is just one example of the many uses of the liquid thermoset insulating composition of this invention.

EXAMPLE 1

Three parallel castings were made (2 castings of 3 Compositions) around the ends of three sets of sandblasted, 242 kV. aluminum electrodes, having hemisphere ends, 1.44 inches in diameter, with flattened faces and stem diameters of about 1.25 inches. All three compositions contained a diglycidyl ether of bisphenol A liquid epoxy resin having a viscosity of from about 11,000 to 14,000 cps. at 25° C., (sold commercially by Dow Chemical Co. under the tradename DER 331), anhydride hardener for the epoxy, 2-methyl imidazole accelerator, and quartz filler.

Composition A contained 5 wt.% polymethyl siloxane dielectric fluid, having a viscosity of about 50 cps. at 25° C. (sold commercially by Dow Corning under the Tradename DC-200 Fluid). Comparative Composition B contained 5 wt.% isopropyl biphenyl, a well known, excellent discharge resistant dielectric fluid, having a viscosity of about 10 cps. at 25° C. Comparative Composition C did not contain any dielectric fluid. The compositions were hot mixed at from about 90° C. to 100° C., with the accelerator added last, and remained fluid and highly castable for about 20 minutes.

Two aluminum electrodes, without any mold release agent coating, of the type previously described, were placed in a mold coated with release agent, with the rounded heads facing each other at a spacing of 0.125 inch. A release agent should not be applied to any metal conductor surface where adhesion to the resin is desired, but only to mold surfaces where separation is desired after resin curing. The electrodes and mold were heated to about 100° C. and the casting compositions were degassed and vacuum cast, at about 95° C., around and between the electrodes. The filled molds were held under vacuum for about 30 minutes. The castings were left in the mold at about 90° C. for 20 hours. After hot demolding, the castings were post-cured at 135° C. for 6 hours in a forced air oven.

The insulating thickness around electrode stems was about 1.5 inches. The moldings, each containing the two encapsulated electrodes were placed in a high voltage endurance test at B 60 kV, giving a stress of 480 volts/mil. at 420 Hertz across the 0.125 inch gap between each electrode hemisphere. The composition of the three Compositions and the test results are given below in Table 1:

TABLE 1

| | Parts by Weight (wt. %) | | | | | |
|---|---|---|---|---|---|---|
| | Epoxy | Anhydride | Filler | Accelerator | Dielectric Fluid | Failure Times** |
| Composition A | 100 (13.2 wt %) | 80 (10.5 wt %) | 540 (71.2 wt %) | 0.08 | Polymethyl Siloxane 37.9 (5.0 wt %) | 18,275 hrs. and 20,857+ hrs.*** |
| Composition B* | 100 (13.2 wt %) | 80 (10.5 wt %) | 540 (71.2 wt %) | 0.08 | Isopropyl Biphenyl 37.9 (5.0 wt %) | 2,722 hrs. and 4,700 hrs. |
| Composition C* | 100 (13.8 wt %) | 80 (11.1 wt %) | 540 (75.0 wt %) | 0.08 | 0.0 (0 wt %) | 5,695 hrs. and 9,997 hrs. |

*comparative samples
**failure = sudden carbon tracking between the electrodes with resultant voltage drop
***taken off without failure As can be seen, the low viscosity organopolysiloxane dielectric of Composition A, the composition of this invention, provided outstanding resistance to voltage stress, indicating precipitation of the dielectric fluid out of the crosslinking epoxy resin and flow or diffusion to fill voids at the resin-electrode and resin-filler interfaces. The isopropyl biphenyl dielectric of comparative Composition B was too soluble in the epoxy or vaporized and did not fill voids. Filler could be eliminated and the organopolysiloxane could still, in some constructions, be effective to provide protection against voltage stress. Elimination of filler, however, could increase the overall expansion coefficient of the cured resin to a value higher than any desired cast in conductors or metal parts and could lead to differential expansion cracking or separation at metal and resin interfaces. Urethane resins and polyester resins would also provide outstanding results.

We claim:

1. A completely cured insulating composition disposed about at least one conductor, said cured insulating composition necessarily having minute voids therein and/or having minute voids at the composition-conductor interface, said cured composition being a completely cured admixture of ingredients, the admixture comprising:

(A) a liquid, polymerizable organic resin system selected from the group consisting of epoxy, polyurethane and polyester resin systems;

(B) a low viscosity, liquid, non-polymerizable organopolysiloxane dielectric filler having the structural formula:

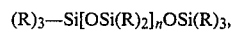

$(R)_3-Si[OSi(R)_2]_n OSi(R)_3$, where n=0 to about 10, and each R group is selected from H, alkyl having from 1 to 6 carbons, and phenyl; and (C) solid, inorganic filler particles, where the admixture contains from about 2 wt.% to about 15 wt.% liquid, organopolysiloxane dielectric based on the total weight of (A), (B) and (C), and from about 20 wt.% to about 85 wt.% solid, inorganic filler particles based on the total weight of (A), (B) and (C), and the liquid organopolysiloxane dielectric is from about 60% to about 95% soluble in the liquid, organic resin system; where the completely cured insulating composition is an organic resin matrix containing liquid organopolysiloxane dielectric, where the liquid organopolysiloxane dielectric remains non-polymerized, having precipitated out of solution as a liquid, and flows or diffuses through the resin matrix to fill the voids within the insulating composition or at the insulating composition-conductor interface, and where the liquid organopolysiloxane dielectric in the completely cured insulating composition will flow or diffuse to fill voids caused by thermal cycling or voltage stress which may occur after complete curing of the composition.

2. The completely cured composition of claim 1, wherein the resin system comprises an epoxy-anhydride, and the organopolysiloxane dielectric is polymethyl siloxane.

3. The completely cured composition of claim 2, where an accelerator is used with the epoxy resin, and the epoxy is a diglycidyl ether of bisphenol A.

4. The completely cured composition of claim 1, where the conductor is an electrical conductor selected from the group consisting of bushing conductors, cables, post insulators and cryogenic termination studs.

5. The completely cured composition of claim 1, where the organopolysiloxane dielectric has a viscosity of from about 10 cps. to about 450 cps. at 25° C.

* * * * *